Fig. 2.

May 3, 1932. E. J. PANISH 1,856,927
VALVE CONTROL
Filed Feb. 17, 1930 3 Sheets-Sheet 3

INVENTOR.
Erwin J. Panish,
BY
ATTORNEY

Patented May 3, 1932

1,856,927

UNITED STATES PATENT OFFICE

ERWIN J. PANISH, OF BRIDGEPORT, CONNECTICUT

VALVE CONTROL

Application filed February 17, 1930. Serial No. 428,962.

This invention relates to valve controls, and more particularly, to valve controls having means for rendering the motor inoperative upon cessation of movement of the valve, such, for instance, as disclosed in my application Serial No. 251,451, filed February 2nd, 1928, now Patent No. 1,747,594.

In the device disclosed in my said application, the means for rendering the motor inoperative to continue to apply power to the valve or valve-actuating mechanism could be variably set so that the motor would be rendered inoperative immediately upon the disk reaching its seat or when the closing movement of the disk is interrupted by an obstruction in its path. Or, the means could be so set that the motor would be rendered inoperative upon the application of a certain torque to the valve-actuating mechanism, which torque would be so predetermined as to be slightly less than that which could safely be applied to the valve-actuating parts. In such case, the valve could be closed against one-sided pressure, but then the valve would be seated with heavy torque under both normal and one-sided pressure or emergency conditions, resulting in unnecessary seating pressure and wear-and-tear on the parts for the normal operations of the valve.

An object of the present invention is to provide means whereby the valve may be seated under normal conditions with a predetermined amount of torque and the resulting normal seating pressure, and yet may be closed under abnormal or emergency conditions, such, for instance, as might occur from a break in the line causing one-sided pressure on the valve disk, which requires a greater amount of torque to overcome the one-sided pressure on the disk. Of course, under such circumstances, the pressure with which the disk seats will not be abnormal, because the power applied to the disk by the motor is partly consumed in overcoming the frictional resistance of the valve disk in its guides due to the one-sided pressure condition.

This may be accomplished, according to the present invention, in several ways—one way being by providing a manually initiated emergency valve-closing device adapted to permit abnormal torque to be applied by the motor under emergency conditions, as disclosed in my application filed of even date herewith.

In the present embodiment of the invention disclosed herein, this is accomplished by automatic variation or adjustment of the means for determining the torque which the motor may apply to the valve-actuating mechanism by means responsive to one-sided pressure conditions, that is to say, in the form of the invention herein disclosed, means are provided for permitting a predetermined torque to be applied to the valve-actuating mechanism under normal valve-closing conditions, but these means are variable and are in communication with the line controlled by the valve so that when the pressure on one side of the valve increases, the amount of torque which the motor may apply to the valve also increases and proportionately permitting the motor to apply more power when more power is needed and in accordance with the requirements.

This excess power which may be applied by the motor is, of course, absorbed by the extra work required to close the valve under one-sided pressure, and hence the valve will in all cases be seated with substantially the same amount of seating pressure regardless of the one-sided pressure conditions. Of course, the valve is designed mechanically to withstand the necessary amount of torque which the motor must apply to the valve-actuating mechanism under full one-sided pressure. But, as in my Patent No. 1,747,594, at no time can the motor apply torque in excess of the maximum torque for which the valve and valve-control are designed. Thus, it will be seen that while there is a fixed limit above which the motor cannot apply torque to the valve below this limit, the amount of torque which may be applied is variable and governed by the pressure in the line.

Two specific embodiments for accomplishing the results of the present invention are shown herein. In both forms, pressure-responsive means are connected to the line; and in one form this pressure-responsive means varies electrical portions of the system, while in the other form it varies the mechanical portions of the system.

In the accompanying drawings which illustrate two embodiments of the present invention—

The present invention is herein illustrated as applied to the valve opening and closing device described and claimed in my copending application Serial No. 251,415, filed February 2nd, 1928, now Patent No. 1,747,594, February 18, 1930, to which attention is directed for a more complete understanding of the general structure of the valve opening and closing device illustrated herein, like reference numerals being applied to the same parts in said patent and in this application.

Figure 1:
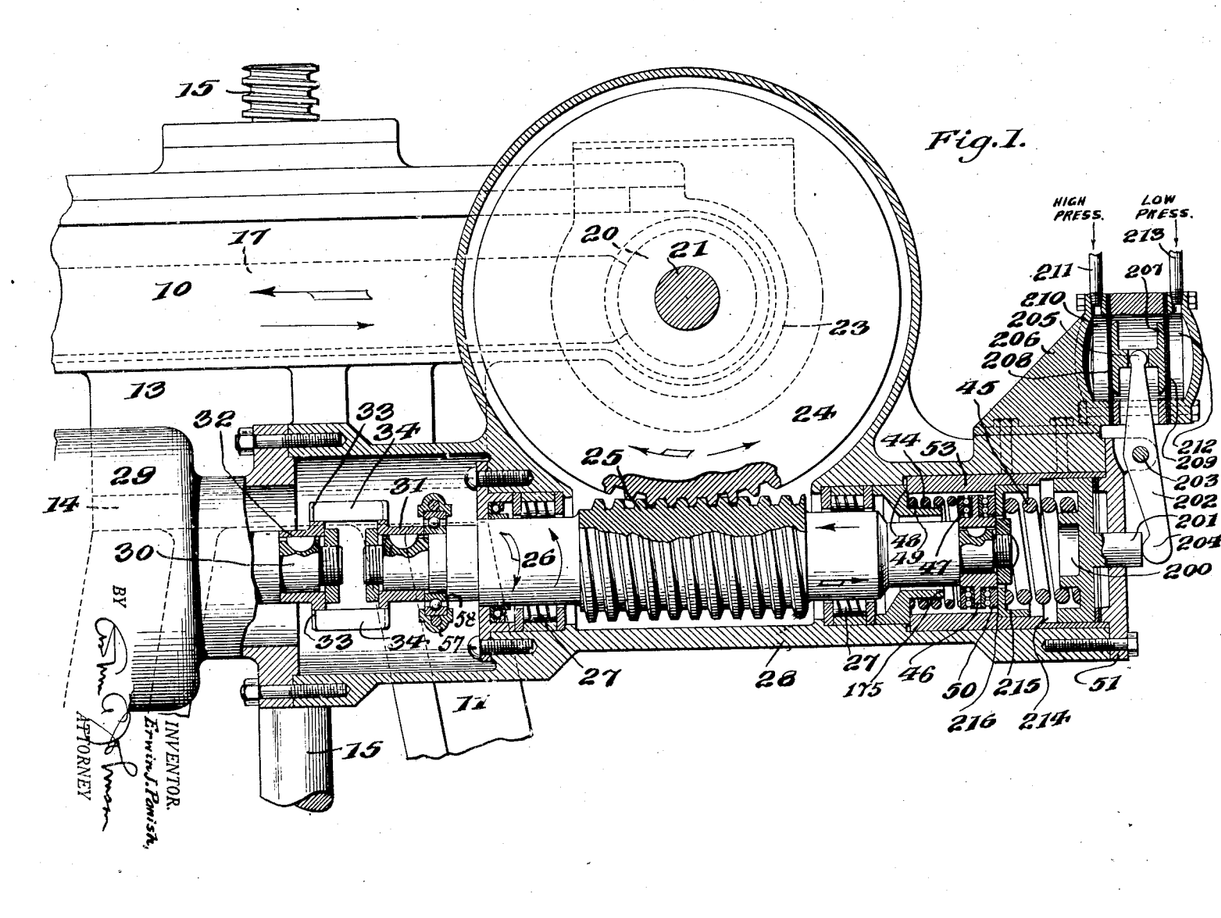
Figure 1 is an elevation of part of a valve arch showing the valve control device of the present invention with parts of the casing removed or broken away to show in detail part of the driving train and other important parts—some of which are shown in section.

The device to which the present invention is applied comprises a casing 10 formed of a number of castings secured together for supporting and concealing various parts of the mechanism, and for supporting the device on the arch 11 or other part of the valve. As shown, the part 13 of the casing 10 is adapted to be bolted to the top 14 of the arch so that the screw-threaded valve-stem 15 passes through the casing, as shown in Fig. 1. In this part 13 of the casing is located the arch-nut which engages the valve-stem 15 and by the rotation of which, in opposite directions, the valve-stem and valve disk are moved up and down to open and close the valve.

To rotate this arch-nut, there is mounted in the part 13 of the casing, concentric with the valve-stem 15, a worm-wheel 17. In the form of the present invention herein shown, the worm-wheel 17 is part of the valve-actuating mechanism, other parts of which are a worm 20 having a shaft 21 carried in bearings in a part 23 of the casing; a worm-wheel 24 supported by and adapted to drive the shaft 21; and a worm 25 having a shaft 26 mounted in bearings 27 carried by a part 28 of the casing 10.

This train of gearing is adapted to be driven by an electric motor 29, whose casing is shown bolted to the end of part 28 of the casing 10, so that the motor shaft 30 is substantially in axial alignment with the worm-shaft 26. The motor shaft 30 is connected to the worm-shaft 26 to drive the same by a coupling which, for facilitating the attachment and removal of a motor and for other purposes herein referred to, preferably is of the sliding type. As shown, this coupling consists of a pair of sleeves 31 and 32 keyed and secured to the shafts 26 and 30 respectively, the sleeve 32 having a pair of slots 33 extending in the direction of and adapted to be engaged by a pair of arms 34 on the sleeve 31. Hence, when a new or replacement motor is being installed, it is merely necessary to see that the arms 34 enter the slots 33, as shown in Fig. 1 before bolting the motor casing to the casing 10—this, without making any mechanical operation to secure the coupling parts together.

For emergency use, in case of lack of current to operate the motor or other electrical difficulties, there may be provided a wheel which may be operated by hand to turn the worm 20 and the worm-wheel 17.

To avoid certain difficulties with valve controls known prior thereto, I have provided, by my invention described and claimed in my Patent No. 1,747,594, means responsive to the reaction produced as a result of cessation of movement of the valve-actuating mechanism while the motor continues to apply power thereto for rendering the motor inoperative to apply power to the valve-actuating mechanism. That is to say, I have provided means for removing the power supplied by the motor to the valve-stem when the torque developed by the motor reaches a value determined in advance with regard to the ultimate torque which can safely be applied to the valve as dictated by sound engineering principles, the mechanism being responsive to one predetermined torque when moving the valve in closing direction and to a different and quantitatively lesser torque when moving the valve in opening direction thereby to permit the valve to be brought very gently but firmly against the bonnet bushing of the valve, an operation which was, prior to that time, impossible except by hand operation.

The torque-responsive means of the present invention, as illustrated in Fig. 1, is substantially the same as that disclosed in my aforesaid patent, although, as will be pointed out below, according to the present invention, the torque of which the device is responsive is variable during the operation of the device and not fixed as in said patent.

In my patent above referred to as well as herein, since the controlling factor of the device is the increasing of the load on the parts of the valve-actuating mechanism upon cessation of movement of the valve, and since increase of load produces increased end-thrust in worm-gearing or other angular toothed gearing, there is provided means operated by the increased end-thrust of part of the gear train to render the motor inoperative to apply further power to the valve-actuating mechanism.

Accordingly, the worm-shaft 26 is not held against all end-thrust movements, but instead the bearings 27 are adapted to permit such movement in both directions, which movement is further permitted by the sliding coupling 31—32 between the shaft 26 and the motor shaft 30. Normally, the shaft 26 is held in condition of substantially stable equilibrium between limits of movement endwise, by a pair of springs 44 and 45 located on opposite sides of a disk 46 secured to the shaft 26. The spring 44 is located between an anti-friction thrust bearing 47 and a flange 48 on a sleeve 49 carried in the part 28 of the casing 10, and the spring 45 is located between another anti-friction thrust bearing 50 on the disk 46 and a cover plate 51 adapted to be secured to the part 28 of the casing 10 by bolts 52. When assembling the device, a sleeve 53 is placed in the part 28 of the casing, so that as the bolts 52 are drawn up, the cover plate 51 will force the sleeve 53 inwardly moving the sleeve 49 until it strikes the bearing 27 to firmly hold the latter and the sleeve 49 in the position shown in Fig. 1.

When work is performed by the valve-actuating mechanism as when opening or closing the valve, the shaft moves endwise within its limits an extent dependent upon the resistance which the valve may offer to movement. During ordinary conditions after movement of the valve has been started and before seating, the shaft moves endwise very little, for the springs 44 and 45 are made stiff enough to prevent any appreciable endwise movement of the shaft under ordinary running load condition.

The gear train of the valve-actuating mechanism is such that the gears travel in the directions of the feathered arrows shown in Fig. 1, when the valve is being closed. Consequently, when the valve-disk becomes seated or when it meets an irresistable obstruction, the increased load resulting therefrom, or the actual stopping of the gear train including the worm-wheel 24, causes the worm 25 to screw through the teeth of the worm-wheel 24, and hence moves axially in the direction of the feathered arrow shown in Fig. 1, thus compressing the spring 45. When the valve is being opened, the motor shaft 30 rotates in the opposite direction, and hence the gears move in the direction of the tailless arrows shown in Fig. 1. When the parts rotate in these directions, should a load greater than that which is predetermined be applied to the valve-actuating mechanism, the worm 25 will move to the left, as seen in Fig. 1 and shown by the tailless arrow therein. At this time the spring 44 is compressed. During compression of either spring 44 or spring 45, no appreciable action, tending to brake the motion of the worm 25 and its shaft 26, results because of the provision of the anti-friction thrust bearings 47 and 50 interposed between the springs 44 and 45 respectively and the disk 46.

Hence it will be seen that means are provided for imparting endwise movement to a part of the valve-actuating train as a result of changes in loads on the other parts thereof.

This endwise movement of the shaft 26 may, in any suitable way, render the motor 29 inoperative to apply further power to the valve-actuating mechanism, but, in the present invention, the endwise movement of the worm-shaft 26 electrically controls the motor to render it operative or inoperative. Since it is preferable that the valve be controlled from a remote point and since the remote control of the valve mechanism is improved or facilitated by an arrangement of secondary controls, the embodiment of the present invention herein shown does not provide means for directly opening the motor circuit when desired, but does this through the secondary control of the remote control device.

Briefly described, this control mechanism comprises a remote control station having push buttons or other circuit-closing means for actuating a relay switch in the motor circuit, and automatic switches controlled by the endthrust movements of the worm-shaft 26 for opening the hold-in circuits of the relay switch when a predetermined torque is applied by the motor to the valve-actuating mechanism upon cessation of movement of the valve disk.

In my prior device, the automatic switch controlling the motor operation for valve closing was so set, and the tension of the spring 45 was so predetermined, that the valve disk was seated with one definite, predetermined pressure under all conditions. Nevertheless, that predetermined pressure could be varied by a mechanical readjustment or fixed setting of the parts so that either one of two modes of operation could be obtained.

That is to say, the fixed setting could be such that the motor could apply only such torque as is necessary to close the valve with as light seating pressure as would be required for expected normal operation of the valve, and assuming that the valve would always be operated with the pressures on opposite sides of the valve being balanced. This kind of setting is extremely desirable where feasible. Or, the fixed setting may be such that the motor may apply torque in excess of that normally necessary, so that the valve-disk would be seated under emergency conditions, for instance, against one-sided pressure in the line. This is not desirable, for the valve seats and valve-disk surfaces would be subject to undue and unnecessary wear due to the heavy seating pressures which they will be normally subjected to, when pressures in the line on opposite sides of the valve-disk are balanced.

One of the objects of the present invention is to provide means whereby the motor applies a definite predetermined torque to the valve-actuating mechanism under normal conditions when the seating pressure will be no heavier than necessary for a balanced line condition, and the requisite amount of torque to the valve-actuating mechanism when there is one-sided fluid pressure against the valve disk when the latter is being moved to closed position.

This may be accomplished by mechanically or electrically varying the pressure of the spring 45 or by delaying the action of the automatic switch for opening the motor control circuits—both modes of operation being illustrated herein in two specifically different embodiments of the invention herein illustrated.

In my copending application filed of even date herewith, I have disclosed and claimed means whereby the motor may apply two quantitatively different torques to the valve-actuating mechanism, one torque being the maximum which the motor may apply under normal conditions, and the other torque being greater and being applied by the motor to the valve-actuating mechanism under emergency conditions such as when there is one-sided fluid pressure on the valve disk due to a break in the line. This mode of operation is extremely desirable when practicable where it is possible or feasible to provide an emergency valve-control station for operating the valve under emergency conditions, as disclosed in my said companion application.

According to the present invention, as will appear below, the torque which the motor may apply to the valve-actuating mechanism is universally variable between maximum and minimum limits and in accordance with the difference between the fluid presures on opposite sides of the valve disk.

Thus the valve control of the present invention is automatically adjusted to meet emergency or abnormal conditions and seats the valve disk with the same amount of pressure under all conditions because the excess torque permitted to be applied by the motor is absorbed by the extra resistance caused by the one-sided pressure upon the valve disk; also, because should the pressures on opposite sides of the disk become balanced or their difference increase or decrease during the closing of the valve, the torque-responsive means will automatically adjust itself to the changed conditions and permit the motor to apply just that torque which is necessary to seat the valve disk with a predetermined pressure sufficient to seat the valve disk tightly without jamming.

Figure 2:
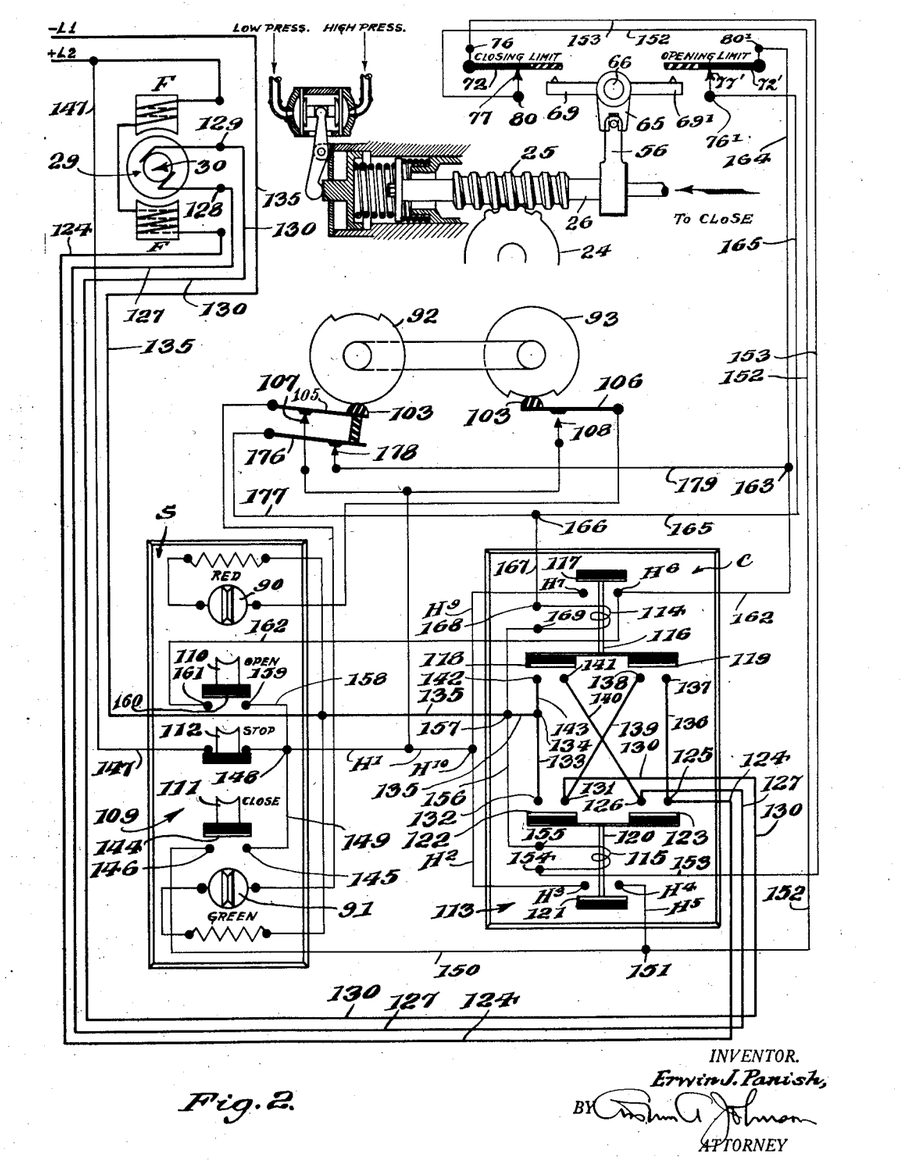
Fig. 2 is a schematic view of parts of the device of the present invention, including a wiring diagram showing how various parts are connected together electrically.
Figure 3:
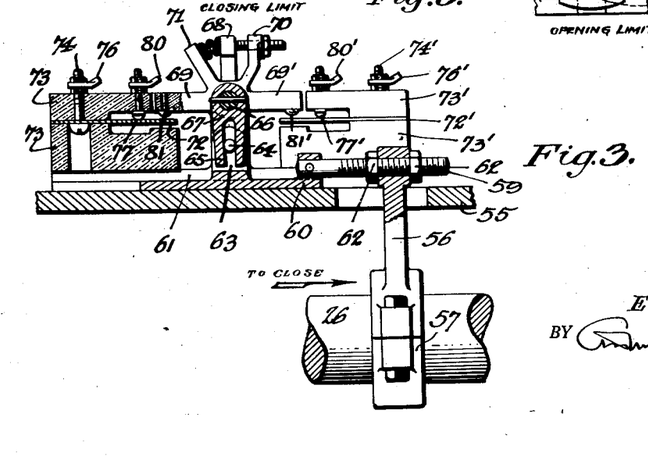
Fig. 3 is a detail view showing the switch mechanism diagrammatically illustrated in Fig. 2.

The embodiment of the invention wherein the tension of the spring 45 is automatically varied is illustrated in Figs. 1, 2 and 3, and to begin with, the switches and the circuits for controlling the motor and secondary remote control circuits will first be described.

The torque-responsive means includes a switch mechanism which, as shown in Fig. 3, is identical with that shown in my Patent #1,747,594. This switch mechanism is mounted in a housing 54 secured upon the part 28 of the casing 10 which encloses the sliding coupling 31—32 and the adjacent end of the worm-shaft 26, the housing 54 being separated from the portion 28 of the casing by a plate 55. The plate 55 is provided with an elongated slot through which the arm 56 having a two-part clamp 57 by means of which it is secured to the outer race of a ball-bearing 58, the inner race of which is secured to the worm-shaft 26. Hence, when the worm-shaft 26 moves endwise, the arm 56 is moved in the slot in plate 55. Within the housing 54, the end of the arm 56 is connected by a screw rod 59 with a slide 60 riding on the plate 55 between rails formed by a pair of plates 61. The rod 59 passes freely through the arm 56, but is held thereto by a pair of nuts 62 by means of which the relative position of the arm 56 and the rod 59 may be initially adjusted. The adjustment is provided so that the slide 60 may be in a predetermined neutral position at the time that the worm-shaft 26 is in its neutral position as determined by the balance resulting from the action of the springs 44 and 45 against each other. After the device is assembled and before any further adjustments of any kind are made, the nuts 62 are so adjusted on the screw rod 59 that the slide 60 assumes its neutral position, that shown in Fig. 3.

The slide 60 carries arms 63 having a cross-pin 64 located in forked arms 65, the fork being located between the arms 63. The forked arm 65 is pinned to a shaft 66 passing through a pair of bearings 67, one being formed integral with each rail plate 61. The shaft 66 has a pair of arms 68 pinned thereto (see Fig. 3) and these arms cooperate with levers 69 and 69′ mounted to rotate the shaft 66. The levers 69 and 69′ are provided respectively with a pair of arms 70 and 71 lying in opposite sides of the arms 68 and 68′. The arrangement is such that when the shaft 66 is rocked by movement of the slide 60, caused by endwise movement of the worm-shaft 26, the levers 69 and 69′ will also be rocked, one toward the plate 55 and the other away from the plate 55, according to the direction of rotation of the shaft 26.

The levers 69 and 69' are adapted to control a pair of circuit opening means comprising contact springs 72 and 72' mounted in blocks of insulating material 73 and 73' each secured to its adjacent rail 61. The springs 72 and 72' are secured to the blocks 73 and 73' by screws 74 and 74' provided with a pair of nuts by means of which wire terminals 76 and 76' are adapted to be electrically connected to the contact springs 72 and 72'. Also supported on the blocks 73 are contact points 77 and 77' adapted to be electrically connected with wire terminals 80 and 80'. Normally, the contact springs 72 and 72' engage their contact points 77 and 77' respectively, so as to close the circuit between the wires 76 and 76' and 80 and 80' respectively (see Fig. 3).

When the worm-shaft 26 is moved in the direction of the feathered arrow shown in Fig. 3, the levers 69 are rocked counterclockwise with the shaft 66, causing an insulated button 81 on the lever 60 to engage the contact spring 72 and remove it electrically from the contact point 77 so as to open the circuit, of which the wire terminals 76 and 80 form a part. If, however, the worm-shaft 26 is moved in the other direction, the shaft 66 will be rocked clockwise, and accordingly the arm 69' and button 81' will engage its adjacent spring 72' to open the circuit, of which wire terminals 76' and 80' form a part. Thus, when the shaft 66 with the arms 69 and 69' is rocked in either one direction or the other, either one circuit or the other is opened.

It was above stated that the arms 70 and 71 on the lever 69 and 69' embrace one of the arms 68 and 68' on the shaft 66, and for the purpose of explaining the operation of the device it was presumed that the contact between the arms and the levers was direct. This, however, is not so, for it is preferable that springs or other yielding means be located between the arms 68 and the arms 71 respectively while an adjustable screw is located between the arms 70 and the arms 68. The springs are provided so that there may be a yielding connection between the levers 69 and 69' and the arms 68 as and for the purpose described in my Patent #1,747,594.

To indicate at the control station when the valve is closed and when it is open, there are provided pilot lights 90 and 91 (see Fig. 2) which are controlled by automatic switches operated by the worm-shaft 21 (see Figs. 2, 4 and 5 of my prior Patent #1,747,594). This automatic switch mechanism comprises a pair of cam disks 92 and 93, see Fig. 2, for controlling the pilot lights 90 and 91 respectively.

The gear train actuating the disks 92 and 93 is such that when the shaft 21 rotates for the full movement of the valve, less than a complete, approximately one-half, revolution is imparted to the cam disks 92 and 93.

The cam disks 92 and 93 are provided with spring-pressed followers 103, and the cam disks 92 and 93 are cut away so as to allow the followers to move toward the axes of the disks when the cut portion thereof lies adjacent the followers. The follower 103, which cooperates with the disk 92, is adapted to control a contact spring 105, while the follower 103, cooperating with the cam disk 93, is adapted to control a contact spring 106, the spring 105 cooperating with a contact point 107 and the spring 106 cooperating with a contact point 108, and the springs 105 and 106 being normally so biased as to disengage their respective contacts 107 and 108 when allowed to do so by their followers 103.

The contact spring 105 and contact 107 are adapted to control electrical circuits leading to the pilot light 91 which is green and which indicates that the valve is closed while the contact spring 106 and contact 108 control a circuit leading to the pilot light 90 which is red and which indicates that the valve is open, the cam disks 92 and 93 being so arranged with relation to the valve-disk that these respective switches are made operative when the valve disk is closed and opened. The circuits controlled by the contact springs 105 and 106 will be described below.

The valve control device of the present invention, in common with other valve controls heretofore provided, has a control station S which may be located in the vicinity of the valve or at a remote point, as desired. This valve control station S herein illustrated comprises a box 109 in which is mounted a valve-opening button 110, a valve-closing button 111, and a stop button 112, by means of which the valve may be brought to rest to any position which it may assume at the time the button 112 is depressed.

Cooperating with the control station S is the electromagnetic reversing switch or contactor C comprising a box 113 in which is mounted a solenoid 114 for controlling the circuits during opening of the valve and a solenoid 115 for controlling the circuits during closing of the valve. The solenoid 114 is provided with an armature 116 having contacts 117, 118 and 119, while the closing solenoid 115 is provided with an armature 120 carrying contacts 121, 122 and 123.

When the closing button 111 is pressed and the solenoid 115 is energized, the armature 120 is moved to bring its contacts 121, 122 and 123 into engagement with cooperating contact points therefor. As a result of this, current flows from a power-line L2 through the fields F of the motor 29, thence through wire 124 to the contact point 125, through the contact 123 to the contact point 126, through wire 127 connected to the brush terminal 128, through the armature A to the other brush terminal 129, through the wire 130 to the contact point 131, through the contact 122 on the armature 120 to the contact point 132, through the wire 133 to the junction 134 connected by the wire 135 to the other line L1 of the power-line. This causes the motor to rotate in the direction necessary to close the valve.

Should the button 110 be operated and its associated solenoids 114 be energized, the armature 116 will be moved so that its contacts 117, 118 and 119 are moved to circuit-closing positions. When this happens, current flows as before from the positive line L2 of the power-line through the field F and wire 124 to the contact point 125, where a wire 136 is connected with a contact point 137. Since the armature 116, as stated, is in its operative position, current then flows from the contact point 137 through contact 119 to contact point 138, then through wire 139 to contact point 131 joined with the wire 130 leading to the brush terminal 129, through the armature 30 to the brush terminal 128, through wire 127 to contact 126 which is joined by a wire 140 to contact point 141, from which current flows through the contact 118 to a contact point 142 connected by a wire 143 to the junction 134.

From the junction 134 current flows back through the wire 135 to the negative line L1 of the power-line. It will be noted that in the circuit just described, the current flows through the armature in the opposite direction to that of the circuit previously described, and hence the motor will run in the opposite direction, that desired for opening the valve.

Assuming that the valve is open and that it is desired to close the same fully, the operator depresses the closing button 111 which has a contact 144 adapted to bridge contact points 145 and 146. When this is done, current flows from the junction 148, connected to the positive line L2 of the power-line, through wire 149, contact point 145, contact 144 to the contact point 146, thence through a wire 150 to a junction 151 which is connected by a wire 152 to the terminal 80 of the automatic valve-closing switch. At this point, current then flows from the terminal 80 through the contact point 77, contact spring 72, terminal 76, wire 153 to the terminal 154 of the solenoid 115. The other terminal 155 of the solenoid 115 is connected by a wire 156 to a junction 157 connected to the wire 135 leading back to the negative line L1 of the power-line. As a result of the completion of this circuit, the armature 120 is moved to make its contacts 121, 122 and 123 operative with the result that the motor moves in closing direction, current flowing through the circuits above referred to.

At the same time, the contact 121 on the armature 120 closes a holding circuit including contacts H4 and H3, the former being connected by a wire H5 through junction 151 to the wire 152, and the contact H3 being connected by a wire H2, junction H10, wire H1 through junction 148, the stop button 112 and wire 147 to the positive power-line L2 as above described.

The disk of the valve then descends toward its seat as the result of the operation of the valve-actuating mechanism. When the valve disk reaches its seat, or when it ceases to move, the resultant increase in load on the valve-actuating mechanism causes the worm-shaft 26 to overcome the pressure of the spring 45 and move endwise in the direction of the feathered arrow shown in Figs. 1, 2 and 3. This causes the automatic switch mechanism to be operated so that the arm 69 removes the contact spring 72 from the terminal 77 and opens the circuit comprising wire 147 connected to the power line L2, stop button 112, junction 148, wire H1, junction H10, wire H2, contact point H3, contact 121, contact point H4, wire H5, junction 151, wire 152, terminal 80, contact 77, contact spring 72, terminal 76, wire 153, terminal 154, solenoid 115, terminal 155, wire 156, junction 157, wire 135, which, it will be remembered, leads back to the negative power L1. As soon as the solenoid 115 is inoperative, which takes place automatically upon braking of the above circuit, its armature retracts moving its contacts 122 and 123 away from contact points 131, 132 and 125 and 126 respectively, thus opening the motor circuit and causing the motor to be rendered inoperative. At the same time, the contact 121 is moved away from the holding arrangement contacts H3 and H4, so that when the contact spring 72 again moves into engagement with contact 80, as a result of the return of the worm-shaft 26 to normal position under the influence of spring 45, the described control circuit will remain open until the button 111 is again operated.

If it be desired at that time, in order to more tightly seat the valve or to send another surge of power through the valve-actuating mechanism to the valve, for any reason, this may be done merely by depressing the closing button 111 without first "backing-off" the valve, as was necessary with valve controls provided prior to my Patent No. 1,747,594. This is possible because, as soon as the motor is rendered inoperative, the pressure of the spring 45 will cause the worm 25 to screw through the teeth of the worm-wheel 24 and consequently move axially and remake the stopping switch comprising the contact 77, contact spring 72 and terminal 76.

The operation above described occurs under all conditions, but it should be noted that the opening of the motor control circuit is accomplished when the end-thrust on the worm-shaft 26 (as a result of torque being applied by the motor to the valve-actuating mechanism) has reached a value depending upon the tension of the spring 45.

According to the present invention, the tension of the spring 45 is variable and is automatically varied when there is a difference between the pressures on opposite sides of the valve disk.

To accomplish this, there is interposed between the spring 45 and the cap or cover plate 51 of the casing, a slidable plunger 200 having an end 201 projecting through the cover plate 51. This plunger may be operated by electrical or mechanical means as a result of one-sided or unbalanced pressure on the valve disk. In the form of the invention herein disclosed as exemplary thereof, the plunger 200 is operated by a lever 202 pivoted at 203 on the cover plate and having one end 204 engaging the end 201 of the plunger and its other end 205 located in a diaphragm casing 206. The end 205 of the lever 202 is connected with a head or movable block 207 engaged at its opposite sides by diaphragms 208 and 209. The diaphragm 208 covers a chamber 210 which is connected by a pipe 211 to the high pressure side of the pipe line controlled by the valve—that is to say, on the side of the valve in advance of the valve disk as regards the direction of flow of the fluid through the line. The diaphragm 209 covers a chamber 212 connected by a pipe 213 to the line at the other or low pressure side of the valve. When the pressures in the line at opposite sides of the valve are equal, as is the case when the valve is wide open, the parts assume the positions shown in Fig. 1, wherein the head or block 207 is in its neutral or intermediate position. When, however, the valve disk starts to close and there is a difference in pressure on opposite sides of the disk, such as might be caused by a break in the line and consequent escape of the fluid beyond the valve, the diaphragm 208 is extended, moving the block 207, lever 202 to force the plunger 200 inwardly—that is, toward the end of the shaft, and compresses the spring 45 so that a greater force is required to move the worm-shaft 26 endwise, and thus permitting the motor to apply a greater torque to the valve-actuating mechanism before the automatic closing switch 72—77 will be opened.

Since the diaphragm 208 moves more or less according to the difference in fluid pressure between the high pressure side and low pressure side of the disk (movement of the diaphragm 208 being opposed by the pressure on the low pressure diaphragm 209), the extent of compression of the spring 45 will depend quantitatively upon the difference in pressure on the high pressure and low pressure sides of the valve. Moreover, according to the present invention, the torque which the motor may apply to the valve may be further varied while the valve is closing, for, as the disk closes and the effective orifice in the valve is reduced, the pressure on the high pressure side of the valve may build up and still further move the plunger 200 controlling the spring 45 through the diaphragm 208. Or, for instance, when the line is connected to a turbine, the vacuum produced by the operation of the latter might cause a subnormal pressure on the low pressure side of the valve while the valve is being closed. This, of course, would result in a difference in pressure on opposite sides of the valve disk and would permit the diaphragm 209 to recede while the diaphragm 208 expanded with the same result of increasing the tension of the spring 45.

It should be understood that the provision of means for quantitatively varying the torque which the motor may apply is not essential to the successful operation of the torque-responsive valve-controlling device, such as disclosed in my Patent #1,747,594, for the spring 45 can be so initially tensioned as to permit the motor to apply sufficient torque to the valve to close the valve even against one-sided pressure.

However, when that is done, under normal balanced pressure conditions the motor will apply such a great torque to the valve-actuating mechanism before being rendered inoperative that the valve disk will be jammed in its seat with unnecessarily heavy pressure resulting in what is, according to the present invention, unnecessary wear-and-tear on the valve. With the quantitatively varied torque-responsive means of this invention, the disk will be seated with just the right amount of pressure to tightly close the valve without jamming and the power resulting from the application of additional torque by the motor is absorbed, when the valve is moving under one-sided pressure conditions by the resistance required to move the valve in its guides.

In order to prevent the motor from applying so great a torque to the valve-actuating mechanism under any conditions that there would be danger of destroying the valve-actuating mechanism, the present invention provides means for limiting the maximum torque which may be applied. This is accomplished by providing a shoulder or step 214 on the sleeve 53 within which the plunger 200 slides.

To open the valve, the button 110 is depressed. This closes the control circuit comprising wire 147 connected to the power line L2 and its connections to stop button 112 and junction 148, a wire 158, a contact point 159, a contact 160 on the button 110, a contact point 161, a wire 162, a junction 163, a wire 164, terminal 80', contact spring 72', contact 77', terminal 76', wire 165, junction 166, wire 167, terminal 168 of the solenoid 114, terminal 169, wire 170, junction 157, wire 135 leading to the negative power line L1. As the result of the closing of this circuit, the armature 116 of the solenoid 114 is caused to move its contacts 118 and 119 to position to close the motor circuit so that the motor rotates in the valve-opening direction.

At the same time the contact 117 closes a holding circuit comprising contacts H6 and H7, the former being connected to wire 162 and the latter being connected to a wire H9 having a junction H10 with the wire H1 which, through junction 148, the stop button 112 and wire 147 leads to the power line L2. Thus, the control circuit may be automatically held closed while the button 110 is manually released and allowed to return to circuit-opening position shown in Fig. 2.

As pointed out in my Patent No. 1,747,594, experience has shown that more power is required in starting to open the valve than used to seat the valve. Consequently, it would seem necessary that the spring 44, which resists axial movement of the worm-shaft 26 when the parts are moved in valve-opening direction, should be stiffer or more resistant than the valve 45. But, it is not desirable that this be done, for, if the spring 44 were made stiffer than the spring 45, then the shoulder on the valve-stem would engage the bonnet bushing with so much force as to damage the same. The shoulder would be jammed so hard against the bonnet bushing that the spring 45 would then have to be stronger than the spring 44 in order to start the valve in closing direction. Consequently, if the spring 44 were made stiffer than the spring 45, the result of seating the shoulder of the valve stem gently against the bonnet bushing could not be accomplished.

To accomplish this result and yet allow the motor to apply sufficient torque to the valve-actuating mechanism during the initial opening movement of the valve, the present invention provides the spring 44 with less tension than the spring 45, and further provides a stop collar 175 preferably formed integral with the sleeve 49 (see Fig. 1). This stop collar 175 is so arranged that, when the motor 29 commences to turn in valve-opening direction, the torque of large magnitude, which is required to unseat the valve, will cause the worm-shaft 26 to move in the direction of the tailless arrow, Fig. 1.

This will bring the anti-friction thrust bearing 47 against the end of the stop collar 175 with the result that the full torque of the motor may be applied to the valve-actuating mechanism to crack the valve. When the power required to continue the upward movement of the valve diminishes, as it does as soon as the valve is out of the seat, the spring 44 moves the worm-shaft 26 axially until the desired balance between the normal load resistance of the valve-actuating mechanism and the tension of the spring 44 causes the shaft to again assume a substantially neutral position approximating that shown in Fig. 1.

As the shoulder on the valve-stem comes in contact with the bonnet bushing, the resistance or load on the valve-actuating parts again increases, and this causes the worm-shaft 26 to move in the direction of the tailless arrow causing the shaft 66 (see Fig. 2) to rock clockwise with the result that the insulating button 81' on the lever 69' engages the spring contact 72' and opens the circuit between the latter and the contact point 77'. This results in the motor being rendered inoperative by cutting off its supply of current. It will be remembered that the shaft 26 moves endwise at the initial opening or cracking of the valve. This movement too is sufficient to operate the arm 69' to open the circuit by the spring contacts 72' and the contact point 77. But, at this time, it is not desired that the motor be rendered inoperative, for the valve has only started to move in opening direction.

For the purpose of rendering this automatic switch inoperative during the initial opening or cracking of the valve, the present invention provides a circuit and automatic switch adapted to short-circuit the switch 72' and 77' during this initial cracking of the valve. Clearly, it is preferable that such a switch be controlled by the position of the valve, and the switch normally used to control the pilot lights is employed for this purpose. Accordingly, the cam disk 92 which controls the green or closing pilot light 91 operates a spring contact 176 which is in addition to the spring contact 105 which controls the pilot light 91. This spring contact 176 is connected by a wire 177 to the junction 166 leading through the wire 167, terminal 168 to the solenoid 114 and being the same junction from which the wire 165 leads to the contact point 77' of the automatic opening switch, the contact spring 176 cooperating with a contact point 178 connected by a wire 179 to a junction 163 that leads to the other terminal 80' of the automatic switch 72' and 77'. Thus it will be seen that when the contact spring 176 is in its operative position, as shown in Fig. 2, the circuit through the armature 114 is held closed in spite of the fact that the switch 72' and 77' might be opened by operation of the arm 69' as a result of endwise movement of the worm-shaft 26. As the valve-disk approaches its open position, the follower 103 for the cam 92 enters the cut-away portion in the cam allowing the spring contact 176 to move away from the contact point 178. This restores the control circuit to the condition in which it was when the opening button 110 was first operated.

Hence, when the shoulder on the valve-stem engages the bonnet bushing, the valve-actuating train ceases to move, the spring 44 yields, and the worm-shaft 26 moves axially causing the arm 69' connected therewith to open the control circuit. This causes the solenoid 114 to be deenergized and allows the armature 116 to move its contacts 117, 118 and 119 away from their cooperating contact points, with the result that the motor is no longer supplied with power and consequently stops.

Of course, at the same time that the follower 103 enters the cut-away portion of the cam-disk 92, the circuit controlled by contact spring 105 and contact point 107 leading to the green pilot light 91 is interrupted with the result that this light no longer glows, indicating that the valve is opened. In the same manner, when the valve approaches its closed position, the follower 103 of the cam-disk 93 allows the spring contact 106 to move away from its cooperating contact point 108 to open the circuit through the red or open pilot light 91. It will also be noted that during the intermediate stages of movement between the closed position and the open position, lights of both colors glow apprising the operator of the fact that the valve is neither open completely nor closed completely.

Thus it will be seen that quantitatively different torques may be applied to the valve-actuating mechanism when moving to close the valve and, likewise, quantitatively different torques may be applied to the valve-actuating mechanism when opening the valve.

Since the tension of the spring 45 is variable, it would, without the provision of means to prevent it, tend to force the shaft 26 beyond its neutral point and into the range of its movement which is to be used only in opening the valve. To prevent this, the spring 45 does not directly engage the anti-friction bearings 50 of the disk 46 on the shaft 26 and instead a cup 215 slidably mounted in the sleeve 53 is interposed between the end of the spring 45 and the anti-friction bearing 50. This cup is prevented from sliding inwardly toward the shaft 26 by a shoulder or step 216, and thus no amount of compression of the spring 45 can move the shaft beyond the point permitted by the cup 215 and shoulder 216, that is to say, beyond neutral position. Yet, the shaft 26 is free to move in the direction of the tailless arrow in Fig. 1 when the valve is being operated in opening direction.

Figure 4:
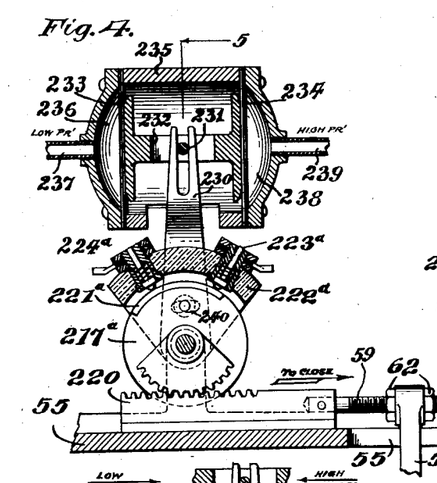
Fig. 4 is a view similar to Fig. 3, but showing a modified form of this invention.
Figure 5:
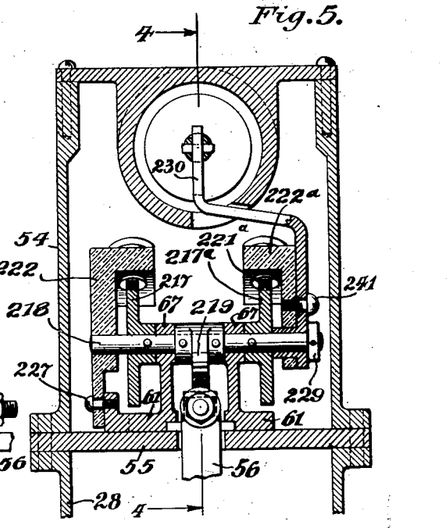
Fig. 5 is a sectional view taken on the line 5 of Fig. 4.
Figure 6:
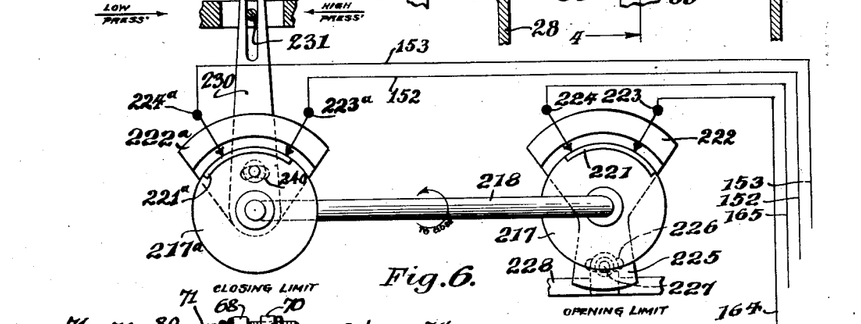
Fig. 6 is a schematic view of the mechanism shown in Figs. 4 and 5, and showing the circuit connections thereto.

As above stated, the objects of this invention may also be accomplished by automatically adjusting the switch mechanism so as to quantitatively vary the torque which the motor may apply to the valve-actuating mechanism. One embodiment of means for this purpose is shown in Figs. 4, 5 and 6. The automatic switch being, for convenience sake, of the rotary type and comprising disks 217—217a carried by a shaft 218 having a segment 219 in mesh with a rack 220 slidably mounted on the plate 55 and connected by the screw 59 to the arm 56 which is connected to move with the endwise movement of the shaft 26. The disks 217—217a are preferably made of insulating material, carrying metal segments 221—221a and have adjacent them segments 222—222a of insulating also mounted on the shaft 218. The disk 222 carries contacts 223 and 224 connected respectively to wires 164—165 of the motor controlling circuit used during the opening of the valve, and the circuit between these contacts is closed by the segment 221 on the disk 217. When the shaft 218 is rocked clockwise as a result of the end-thrust of the worm-shaft 26 upon the bonnet bushing on the valve reaching the bonnet, the disk 217 rotates its metal segment 221 beyond the range of the contact 224 and thus opens the circuit through the wire 164, solenoid 114 and wire 165.

To quantitatively vary the torque which the motor may apply in fully opening the valve, the initial position of the contacts 223—224 may be adjusted with relation to the segment 221, and for this purpose the segment 222 carrying the contacts 223—224 is provided with a tail 225 having a segmental slot 226 through which a screw 227 secured in a part 228 on the plate 55 is mounted. By loosening the screw 227, the segment 222 is loosened so that it may be shifted with relation to the segment 221 on the disk 217, so as to require more or less movement of the disk 217 before the circuit is opened between the segment 221 and the contact 224. If lighter pressure between the bonnet bushing and bonnet is desired, the segment 222 is shifted counter-clockwise as viewed in Fig. 6, so that less movement of the segment 221 and shaft 218 and less tension of the spring 44 is required to open the motor circuit.

The part shown in Fig. 4, I use to control the motor when the valve is moving in closing direction, and the disk 217a and segment 221a are moved counter-clockwise as a result of the end-thrust movement of the shaft 26 in the direction of the feathered arrow shown in Fig. 1. The segment 222a of insulating material related to the segment 221a carries contacts 223a and 224a connected to wires 152 and 153 respectively, controlling the motor when the valve is being closed, the motor circuit being opened when the shaft 26, arm 56, slide 220 and disk 217a have been moved sufficiently as a result of the end-thrust on the shaft 26 to move the contact segment 221a beyond the range of the contact 223a, the magnitude of the torque which the motor may apply to the valve-actuating mechanism depending upon the relative positions of the contact 223a and contact segment 221a.

In order to quantitatively vary the torque which the motor may apply and in accordance with the differences in pressures on opposite sides of the valve disk, the relation between the contact 223a and segment 221a is automatically varied. This is accomplished in the form of the invention herein illustrated by mounting the segment 222a of insulating material freely on the shaft between the disk 217a and a collar 229 pinned on the shaft 218 and connecting to the segment 222a an arm 230 having a pin-and-slot connection 231 with a head 232 located between and supported by a pair of diaphragms 233 and 234 located in a diaphragm casing 235. The diaphragm 233 has a chamber 236 connected by a pipe 237 to the line controlled by the valve at the low-pressure side of the valve disk while the diaphragm 234 has a chamber 238 connected by a pipe 239 to the line at the high-pressure side of the valve disk. Thus, when the pressure on the valve disk is greater on one side than the other, the head 232 is shifted to the left as viewed in Fig. 4, causing the arm 230 to rock the insulating segment 222a counterclockwise and thus increase the distance between the contact 223a and the end of the segment 221a, requiring a greater compression of the spring 45 before the segment 221a moves beyond the contact 223a to open the motor circuit.

What has been said above regarding the diaphragms 208 and 209 in the embodiment of the invention illustrated in Figs. 1 to 3 regarding their response to the pressures at opposite sides of the valve disk applies to the modifications disclosed in Figs. 4 to 6, the only difference being that in the form shown in Figs. 1 to 3, the diaphragm varies the tension of the spring 45 to quantitatively determine the torque which the motor may apply, while the diaphragms in the form shown in Figs. 4 to 6 vary the setting of the switch.

To initially control the amount of torque which the motor may apply to the valve under conditions where the pressures on the sides of the valve disk are balanced, the arm 230 is provided with a segmental slot 240 through which a screw 241 threaded in the segment 222a extends. To adjust the normal position of the segment 222a, the screw 241 is loosened so as to free the segment 222a from the arm 230 and when the desired distances between the contact 223a and the end of the segment 221a is obtained, the screw is again tightened to keep the desired relation between the arm 230 and the segment 222a.

Referring to Fig. 6, it should be understood that the wires 152, 153, 164 and 165 correspond to the similarly numbered wires shown in Fig. 2, and are connected to the control station S and the remote control switch C, and the shunt switch is controlled by the disks 92 and 93 the same as they are in Fig. 2.

Variations and modifications may be made within the scope of this invention and portions of the improvements may be used without others.

Having thus described the invention, what is claimed as new and for which it is desired to obtain Letters Patent, is:—

1. In a valve opening and closing device having valve-actuating mechanism and a driving motor therefor; means for automatically controlling opening and closing movements of the valve by said motor and valve-actuating mechanism and for automatically determining the extent of movement of the valve in both closing and opening directions, said means including means operated when the motor applies a predetermined torque to the valve-actuating mechanism incidental to cessation of movement of the valve for rendering the motor inoperative to apply power to the valve-actuating mechanism; and means responsive to one-sided fluid pressure against the valve for making said last-named means operative only when a greater torque than said predetermined torque is applied by the motor to the valve-actuating mechanism.

2. In a valve opening and closing device having valve-actuating mechanism and a motor therefor; means for automatically seating the valve with the desired pressure and for normally rendering the motor inoperative to apply power to the valve-actuating mechanism when said motor applies a predetermined torque thereto which is sufficient to obtain said desired seating pressure; and means responsive to one-sided fluid pressure against the valve when moving toward its seat for temporarily arresting the operation of said first-named means so that the motor may temporarily apply torque to said valve-actuating mechanism in excess of the said predetermined torque for overcoming the added resistance of said one-sided pressure.

3. In a valve opening and closing device having valve-actuating mechanism and a motor therefor; means for automatically seating the valve with the desired pressure and for normally rendering the motor inoperative to apply power to the valve-actuating mechanism when said motor applies a predetermined torque thereto which is sufficient to obtain said desired seating pressure; and means variably responsive to one-sided fluid pressure against the valve when moving toward its seat for temporarily arresting the operation of said first-named means so that the motor may temporarily apply torque to said valve-actuating mechanism in excess of the said predetermined torque and quantitatively in accordance with said one-sided pressure for overcoming the added resistance of said one-sided pressure.

4. In a valve control having valve-actuating mechanism and a motor therefor; torque-responsive means actuated by said motor for rendering the motor inoperative to apply power to the valve-actuating mechanism upon cessation of movement of the valve; and means responsive to one-sided fluid pressure on the valve when moving toward its seat for determining the maximum torque which the motor may apply to the valve-actuating mechanism before the motor is rendered inoperative by said torque-responsive means.

5. In a valve control having valve-actuating mechanism and a motor therefor; torque-responsive means actuated by said motor for rendering the motor inoperative to apply power to the valve-actuating mechanism upon cessation of movement of the valve; and means responsive to one-sided fluid pressure on the valve when moving toward its seat for variably determining the torque which the motor may apply to the valve-actuating mechanism before the motor is rendered inoperative by said torque-responsive means and quantitatively in accordance with said one-sided pressure.

6. In a valve control having valve-actuating mechanism and a motor therefor; torque-responsive means actuated by said motor and normally biased to render the motor inoperative to apply power to the valve-actuating mechanism upon cessation of movement of the valve; and means for automatically adjusting the biasing of said torque-responsive means.

7. In a valve control having valve-actuating mechanism and a motor therefor; torque-responsive means actuated by said motor and normally biased to render the motor inoperative to apply power to the valve-actuating mechanism upon cessation of movement of the valve; and pressure-operated means for automatically adjusting the biasing of said torque-responsive means.

8. In a valve control having a valve-actuating mechanism and a motor therefor; torque-responsive means actuated by said motor and normally set to render the motor inoperative to apply power to the valve-actuating mechanism upon cessation of movement of the valve; and means for automatically varying the setting of the torque-responsive means.

9. In a valve control having a valve-actuating mechanism and a motor therefor; torque-responsive means actuated by said motor and normally set to render the motor inoperative to apply power to the valve-actuating mechanism upon cessation of movement of the valve; and means including diaphragm-containing means, opposite sides of which are in communication with opposite sides of the valve for automatcally controlling the setting of said torque-responsive means as pressure on one side of the valve becomes greater than pressure on the other side of the valve.

10. In a valve control, a motor; valve-actuating mechanism designed to transmit torque from said motor to the valve with a factor of safety when one-sided fluid pressure is applied to the valve; and means including torque-responsive means for automatically seating the valve with the desired pressure and for normally rendering the motor inoperative to apply power to the valve-actuating mechanism when said motor applies a predetermined torque thereto which is sufficient to obtain said desired seating pressure, said means includng pressure-responsive means for temporarily arresting the operation of the torque-responsive means to allow the motor to apply the full torque necessary to close the valve against one-sided fluid pressure thereon and to permit the torque-responsive means to again be operative should the motor apply to the valve-actuating mechanism torque which equals the torque which said valve-actuating mechanism is designed to carry with said factor of safety.

11. In a valve control having valve-actuating mechanism and a motor therefor; torque-responsive means actuated by said motor and normally set to render the motor inoperative to apply power to the valve-actuating mechanism upon cessation of movement of the valve; and means including a diaphragm in communication with one side of the valve, a diaphragm opposed to said first-named diaphragm and in communication with the opposite side of the valve, and means in engagement with said diaphragms and torque-responsive means for automatically controlling the setting of the torque-responsive means as fluid pressure on one diaphragm becomes greater than pressure on the other.

12. In a valve control, a motor; valve-actuating mechanism operated by the motor and comprising a gear train having members whose characteristics are such that cessation of movement of one member while the other member is moved by the motor produces an end-thrust movement of one of the members; switch means controlled by said end-thrust movement for rendering the motor inoperative to apply power to the valve-actuating mechanism; and means responsive to one-sided pressure on the valve for delaying the action of said end-thrust operated switch.

13. In a valve control, a motor; valve-actuating mechanism operated by the motor and comprising a gear train having members whose charcteristics are such that cessation of movement of one member while the other member is moved by the motor produces an end-thrust movement of one of the members; switch means controlled by said end-thrust movement for rendering the motor inoperative to apply power to the valve-actuating mechanism; means counteracting said end-thrust movement of said members until the motor has applied a predetermined torque to the valve-actuating mechanism; and means responsive to one-sided fluid pressure on the valve for delaying the action of said end-thrust operated switch.

14. In a valve control, a motor; valve-actuating mechanism operated by the motor and comprising a gear train having members whose characteristics are such that cessation of movement of one member while the other member is moved by the motor produces an end-thrust movement of one of the members; switch means controlled by said end-thrust movement for rendering the motor inoperative to apply power to the valve-actuating mechanism; means counteracting said end-thrust movement of said members until the motor has applied a predetermined torque to the valve-actuating mechanism; and means responsive to one-sided fluid pressure on the valve for increasing the counteracting effect of said end-thrust counteracting means for delaying the action of said end-thrust operated switch.

15. In a valve opening and closing device having valve-actuating mechanism and a motor therefor; means for automatically seating the valve with the desired pressure and for normally rendering the motor inoperative to apply power to the valve-actuating mechanism when said motor applies a predetermined torque thereto which is sufficient to obtain said desired seating pressure; fluid-pressure responsive means for permitting the motor to apply torque to the valve in excess of said predetermined torque when moving the valve toward its seat; means for causing the valve to be moved into engagement with a bonnet bushing therefor with a predetermined pressure; and automatic means operative before the valve reaches the bonnet bushing for permitting the motor to apply torque to the valve in opening direction in excess of that sufficient to obtain the said predetermined pressure between the valve and bonnet bushing.

16. In a valve closing device, valve-actuating mechanism; a motor for supplying power to the valve actuating mechanism to close the valve; and means regulated by one-sided fluid pressure on the valve for controlling the maximum power which the motor may apply to the valve actuating mechanism in moving the valve to closed position.

17. In a valve closing device, valve-actuating mechanism; a motor for supplying power to the valve actuating mechanism to close the valve; and means regulated by one-sided fluid pressure on the valve for controlling the closing movements of the valve under power applied by the motor.

18. In a valve control, a motor; valve-actuating mechanism operated by the motor and comprising a gear train having members whose characteristics are such that cessation of movement of one member while the other member is moved by the motor produces an end-thrust movement of one of the members; switch means controlled by said end-thrust movement for rendering the motor inoperative to apply power to the valve-actuating mechanism; means responsive to one-sided pressure on the valve for delaying the action of said end-thrust operated switch; and means for adjustably varying the connection between said switch and said thrusted member.

19. In a valve closing device, a motor; valve-actuating mechanism; means controlling the normal torque which the motor may apply to the valve in valve-closing direction under normal conditions; and means permitting the motor to apply torque to the valve in valve-closing direction in excess of said normal torque under one-sided pressure conditions and quantitatively in accordance therewith.

20. In a valve control, a motor; valve-actuating mechanism operated by the motor and comprising a gear train having members whose characteristics are such that cessation of movement of one member while the other member is moved by the motor produces an end-thrust movement of one of the members; switch means controlled by said end-thrust movement for rendering the motor inoperative to apply power to the valve-actuating mechanism; means counteracting said end-thrust movement of said members until the motor has applied a predetermined torque to the valve-actuating mechanism; and means responsive to one-sided fluid pressure on the valve to shift the switch setting for delaying the action of said end-thrust operated switch.

Signed at Bridgeport, in the county of Fairfield, and State of Connecticut, this 14th day of February, 1930.

ERWIN J. PANISH.